Patented Sept. 3, 1929.

1,726,906

UNITED STATES PATENT OFFICE.

PAUL W. LEFFLAND, OF DALLAS, TEXAS.

COMPOSITION OF MATTER.

No Drawing. Original application filed August 25, 1924, Serial No. 733,986. Divided and this application filed December 24, 1927. Serial No. 242,513.

This is a division of application filed August 25, 1924, Serial Number 733,986, which is now Patent #1,654,042.

This invention contemplates a novel composition of matter primarily intended as a seeding means.

The nature and the advantages of the invention will be better understood when the following detailed description is read.

In order to plant grass seeds or similar seeds of a non-adhesive nature upon a given corrugated or roughened surface of a pottery vase for the intended purpose of producing by germination a novel and ornamental growth over the area of this surface, a great deal of skill, patience and time would be required.

Experiments show that seeds in a dry state may be sprinkled over said pottery surface if same is wetted; however this may be accomplished only by applying a very thin layer or coat for it is only the seeds coming in direct contact with the wet pottery surface which adhere to this surface, the remainder of seeds falling away. And it is only possible for this thin layer to remain intact until germination has taken place, by extreme care against jarring or against wind force. The growth resulting from this thin seed layer is not substantial due to the fact that the root volume is not great enough to produce a substantial interweaving of the roots to hold the growth intact.

On the other hand if such seeds are applied by first wetting a reasonably large bulk of said seeds and applying said seeds to the designated surface in a thick layer by plastering or matting against the surface by pressure from the hand, the result also is not satisfactory. A proportionally small number of the seeds on the outer surface of the layer which is approximately one fourth of an inch thick become dried before germination and naturally fall off of the main body. This falling away is of course undesirable, especially so if the vase is used for ornamentation upon a table or stand in the home. Also the growth is by this method, so thick that it becomes impossible for the thousands of tiny sprouts to exist so closely crowded upon a given area.

A slight jarring of the vase holding either of the above mentioned applications would be disastrous to the seeded portion for at least some portion of same would fall away.

Now in using my new and improved composition and method of application of same no skill, patience or time should be required in covering a vase area made for seeding.

The object of my invention is to provide for the proper distribution of seed on a seeded area of a roughened pottery vase surface so that the closeness of the seeds and the resulting growth will not be so great as to crowd out and cause to wither parts of the area. My object is also to form a base or support for the above mentioned seeds inasmuch as they must be thus sparsely distributed. Further I intend producing by this improvement a composition which might be applied to said vase surface in a thick layer, allowed to dry out, then the vase packed or prepared for shipping or storing with the compound on its surface in a compact and hard and substantial condition, later to be wetted or irrigated for growing, yet still preserved intact by its binding qualities.

In carrying out my invention I mix one part of such seeds as I wish to grow, usually grass seeds, with one and one half parts of finely ground wood pulp. This combination with the addition of water forms a manner of plastic composition, the pulp serving as a binder and also as a filler for the purpose of bringing to the proper quantity the seeds which should be required for a given area and at the same time holding them in place. After measuring out the seeds and pulp as mentioned I add a portion of water as great in volume as the combined volume of the seeds and pulp loosely mixed. I stir this amount of water into the compound with the finger until the water is completely absorbed by the mixture.

This compound now in a wet state I apply to the said vase surface by depositing a reasonable amount upon said surface with the fingers. This portion is now spread out to the desired thickness by slight pressure of the fingers for its binding qualities makes this easily possible. Other portions are added alongside and also pressed out until the desired surface is covered. Now the compound may be allowed to dry thus in place and soon appears to be merely a hard and substantial layer resembling pasteboard however it may be noticed that there are numbers and numbers of small seeds seemingly sewed into the very fiber of same, so to speak. Upon wetting or irrigating this surface the numbers of small seeds germinate and develop into an artistic growth upon the exterior surface of a vase designedly made to irrigate and maintain same.

While it is believed that from the foregoing description, the nature and advantages of the invention will be readily apparent, I desire to have it understood that I do not limit myself to what is herein described and that such changes may be resorted to when desired as fall within the scope of what is claimed.

Having thus described the invention, I claim:

A plastic composition of matter consisting of seeds and finely ground wood pulp, to be mixed with water and to be applied to a surface.

In testimony whereof I affix my signature.

PAUL W. LEFFLAND.